April 11, 1944.  P. S. CLAUS  2,346,359
TOOL FEEDING MECHANISM
Filed Oct. 29, 1941  3 Sheets-Sheet 1
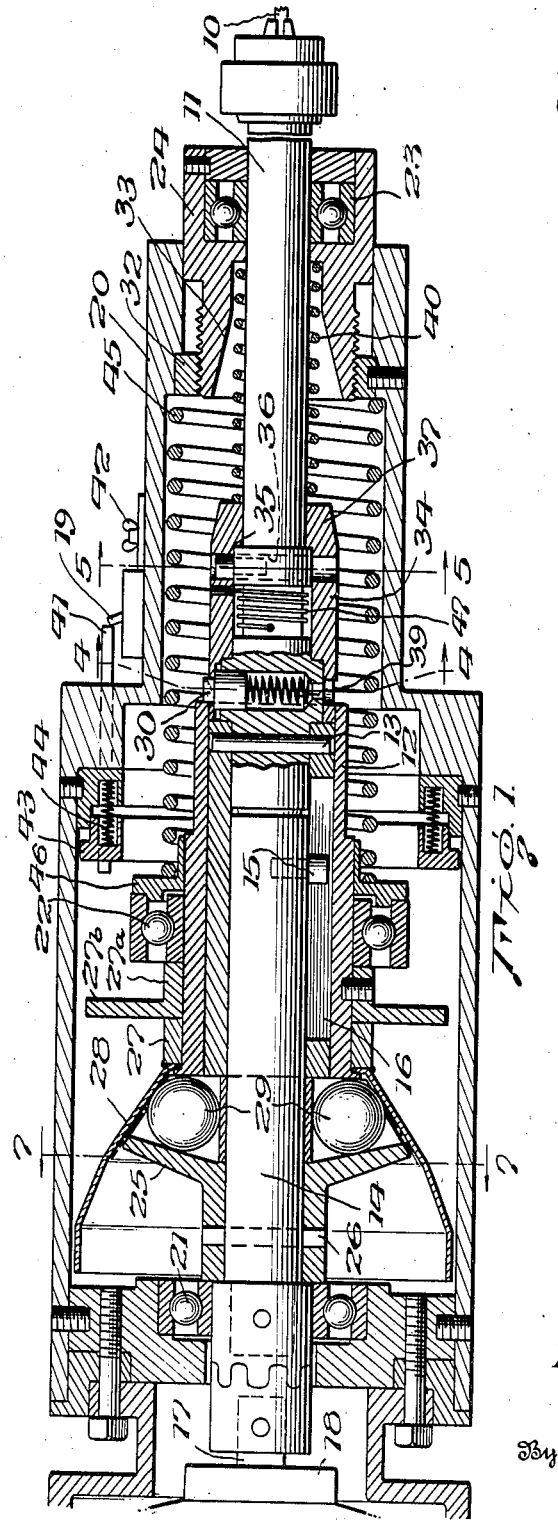
Inventor
Philip S. Claus,
By Church & Church
His Attorneys April 11, 1944.  P. S. CLAUS  2,346,359
TOOL FEEDING MECHANISM
Filed Oct. 29, 1941  3 Sheets-Sheet 2
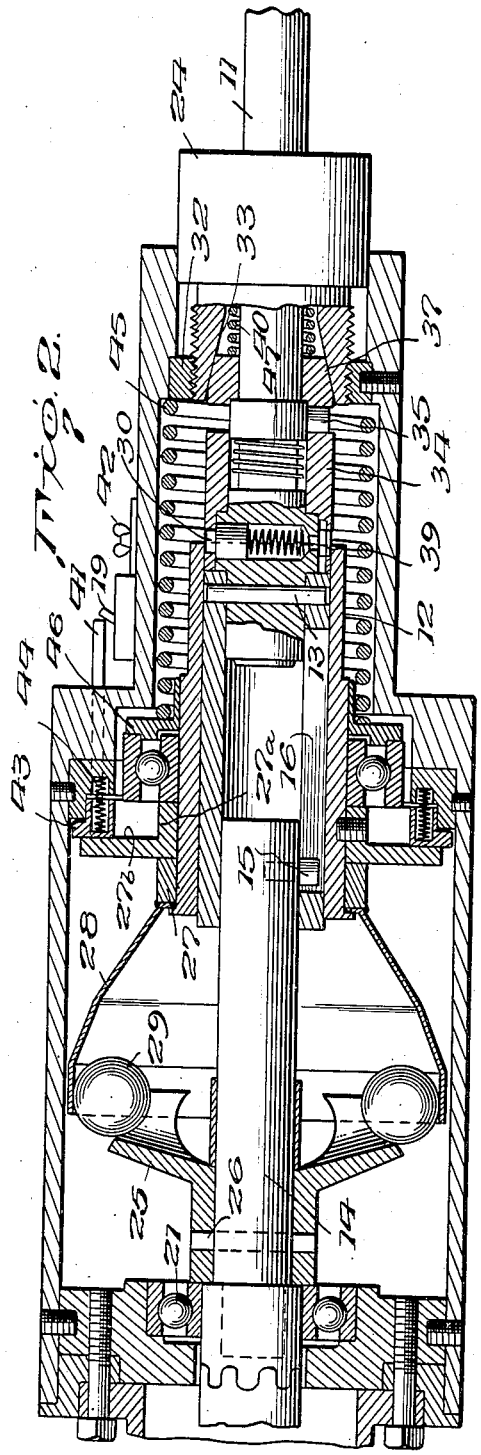
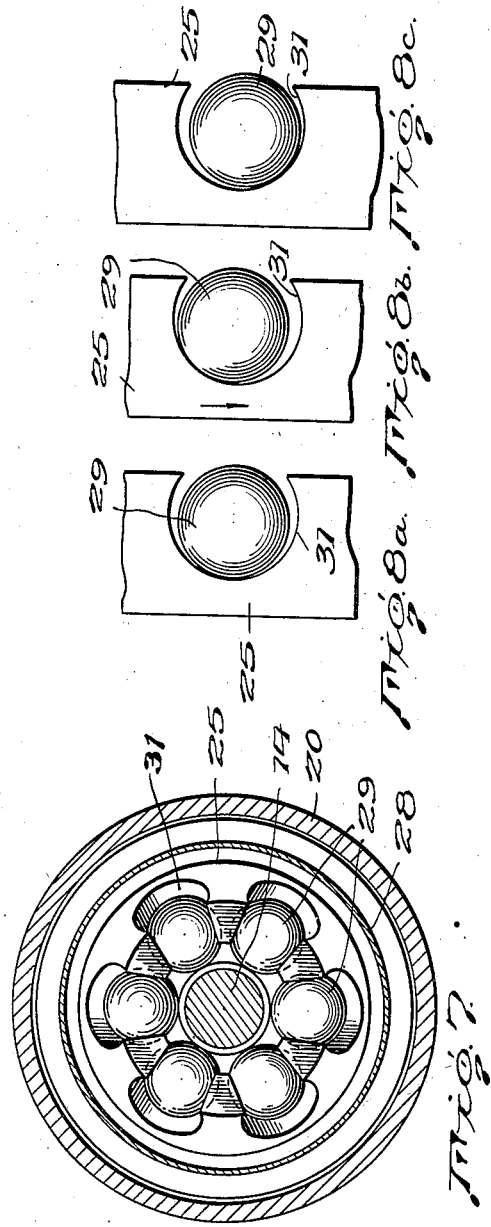
Inventor
Philipp S. Claus,
By Church & Church
His Attorneys April 11, 1944. P. S. CLAUS 2,346,359
TOOL FEEDING MECHANISM
Filed Oct. 29, 1941 3 Sheets-Sheet 3
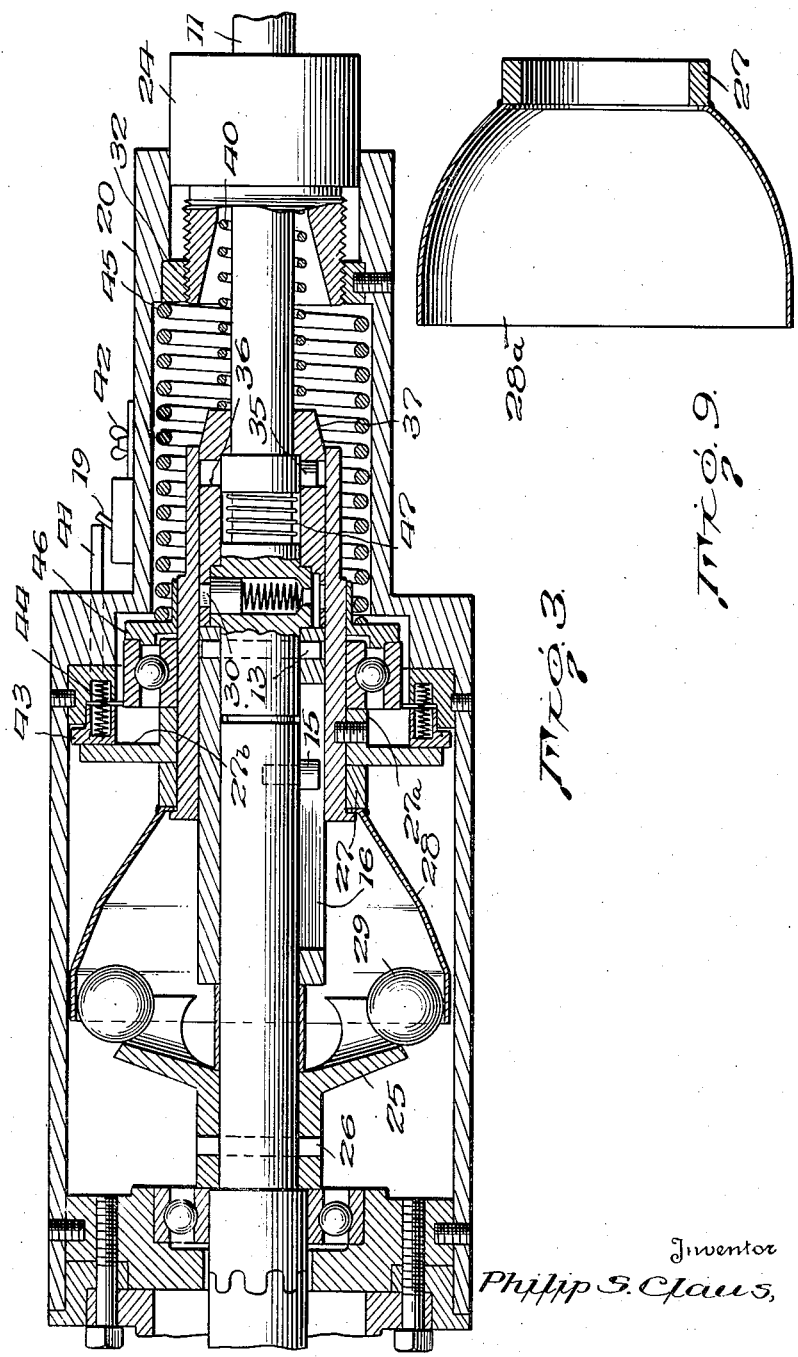
Inventor
Philip S. Claus,
By Church & Church
His Attorneys Patented Apr. 11, 1944

2,346,359

UNITED STATES PATENT OFFICE 2,346,359

TOOL FEEDING MECHANISM

Philip S. Claus, Redford, Mich.

Application October 29, 1941, Serial No. 417,051

8 Claims. (Cl. 77—33)

This invention relates to improvements in tool feeding mechanisms and has to do particularly with the provision of an automatic feed head for rotary drill bits, milling cutters, reamers, and the like.

Due to the fact that various materials, whether metallic or fibrous, are not homogeneous, relatively hard spots or portions are encountered in the drilling thereof and the driving torques which are thus caused to be variable should be compensated for. This compensation for variations in torque cannot be readily accomplished with the ordinary power-driven machine, whether it be gear or hand fed. In instances where hydraulic feed machines are used, the same do accomplish or overcome some of the undesirable features of the gear and hand-feed machines, but, as the action of the hydraulic feed is rather sluggish, it does not possess a truly sensitive action so far as concerns compensation for the variances in driving torques. The primary object, therefore, of the present invention is to provide a tool feeding mechanism which is highly sensitive so far as concerns compensation for or controlling excess pressures that might be exerted on the drilling tool.

In the present feeding mechanism, the means for advancing the drill or cutting tool comprise inertia members or bodies that are actuated by centrifugal force generated by the driving shaft, and a further object of the present invention is to provide a comparatively simple construction for controlling the pressures generated by the centrifugally actuated members. It has heretofore been proposed to use spring means for controlling these forces, and a further object of the invention is to eliminate the use of such springs and still maintain accurate control of the pressure generated by these centrifugally actuated members.

As indicated, the present feeding mechanism comprises a plurality of centrifugally actuated members for advancing or feeding the drill bit or cutter, and the present invention contemplates controlling the forces generated by these members by the provision of a cone-shaped plate against which these members engage, the degree of taper of successive portions of this plate surface decreasing radially outward with respect to the plate. In this connection, it is also proposed that these inertia members be driven positively, as distinguished from frictional drives heretofore proposed.

A further object of the present invention is to increase the sensitivity of the feeding mechanism by providing means whereby the pressures generated for advancing the drill bit or cutter are variable, not only by the radial movement of the inertia members, but also by a limited movement of those members circumferentially of the driving shaft by which said members are influenced. More specifically, the invention contemplates the provision of a plurality of centrifugally actuated members of spherical formation, each disposed in a raceway in a plate fixed to the driving shaft, with the raceways formed with arcuate bottoms of greater radius than that of the inertia members themselves, whereby the inertia members may move laterally of the raceways or circumferentially of the driving shaft, thus encountering higher or lower portions in the bottoms of their raceways to vary the pressure exerted by them in advancing the drill or cutter.

Still another object of the invention is to provide a feeding mechanism wherein, at substantially the moment the drill reaches the limit of its advanced movement, there will be a dwell in its feed movement while it still continues to rotate before the machine is finally de-energized, whereby the bottom of the hole formed by the drill will be substantially smooth and free of burrs or other inequalities on its surface.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a sectional view, taken longitudinally of an automatic feed head for twist drills, the driven shaft carrying the drill bit being shown fully retracted;

Fig. 2 is a similar view, illustrating the shaft carrying the drill advanced and about to be released from its advancing or feeding connections;

Fig. 3 is a similar view illustrating the shaft carrying the drill released and fully retracted and the parts in the positions which they assume at the moment power for actuating the feeding mechanism and tool is cut off;

Fig. 4 is a detail transverse sectional view on the line 4—4 of Fig. 1;

Fig. 5 is a similar view on the line 5—5 of Fig. 1;

Fig. 6 is a detail perspective view of the camming member for releasing the drill-carrying shaft from the instrumentalities by which it is advanced or fed during operation;

Fig. 7 is a transverse sectional view on the line 7—7 of Fig. 1;

Figs. 8a, 8b and 8c constitute a series of detail views illustrating the action of the inertia members in compensating for pressures exerted in the advance of the drill by their motion circumferentially of the driving shaft; and Fig. 9 illustrates a modified form of the cone-shaped plate on which the inertia members act to advance or feed the drill.

In the construction illustrated in the present instance, the drill 10 is carried by what will be termed the driven shaft 11, which comprises a tubular member or sleeve 12, said sleeve being secured to the driven shaft by a pin 13. Rotary motion is imparted to this driven shaft from the driving shaft 14, the driving shaft having a lug 15 engaging in a longitudinal slot 16 in sleeve 12, whereby the sleeve, together with the driven shaft, may move axially with respect to the driving shaft, notwithstanding the fact that the driving shaft imparts rotary motion to the driven shaft. The driving shaft 14 is clutched to the armature shaft 17 of an electric motor 18, and the latter may be controlled by a switch 19 mounted on the forward portion of the housing 20 in which the shafts are suitably journaled in a series of bearings 21, 22 and 23, the latter bearing being carried in an adjustable stop 24 in the forward end of the housing.

For advancing the driven shaft 11 carrying the drill 10 axially with respect to the driving shaft 14 for feeding the drill into the work, there is a disc 25 fixedly secured by a pin 26 on the driving shaft and loose on the sleeve 12 there is a second sleeve 27 carrying a conical, so-called pusher, plate 28 between which and the disc 25 a number of the inertia members 29 are confined. Sleeve 27 is of sectional formation, having an intermediate portion 27ª formed with a radial flange 27ᵇ for purposes which will later appear. The cone-shaped plate 28 is secured to the rear end of sleeve 27 and the forward end of said sleeve engages an abutment 30 carried by the driven shaft. Thus, as will be apparent, when the driving shaft 14 is rotated, centrifugal force will urge the inertia members 29 radially outward and the latter will force the conical plate 28 forwardly, so that the sleeve 27 on which said plate is carried will, through the abutment 30, force the driven shaft 11 and spindle forwardly and feed the latter to and through the work. As the inertia members 29 move outwardly away from the driving shaft, there is a tendency on the part of said members to impose increasing pressures on the conical plate 28, due to the increase in centrifugal force exerted on said members. It has been proposed to compensate for these increases in forces by the use of comparatively short springs exerting counter-forces on the plate and such constructions have not been entirely satisfactory. The counter-force exerted by the springs on the inertia members in these prior structures are particularly noticeable during the initial portion of a drilling operation. For this reason, in the present apparatus, the conical plate has its surface against which the inertia members 29 engage inclined or tapered in such fashion that the contour of the surface will compensate for the increase in centrifugal force exerted by the driving shaft on the inertia members. In other words, the degree of taper or inclination with which the conical plate is formed decreases radially outward from the driving shaft. Expressed differently, while the plate tapers or is inclined forwardly, the degree of inclination or taper of the surface of the plate at successive points outwardly from the shaft is less and less, so that that portion of the plate nearest the shaft has the greatest inclination or taper, while that portion of the plate remote from the shaft has less taper or inclination. Therefore, so long as the inertia members are located relatively close to the driving shaft, they will operate against that portion of the plate 28 of greatest inclination or taper, and, when they are farther from the plate, they will operate against a portion of the conical plate of less inclination or taper, and, consequently, as the centrifugal force of the inertia members increases, the component force generated by those members for advancing the conical plate and driven shaft will become less and less. Thus, the use of springs for compensating for the increase in centrifugal force imposed on the inertia members by the revolving driving shaft is eliminated and it is only necessary to provide a spring of sufficient strength to retract the sleeve 27, as will be later described.

As will be apparent, the forward feeding or advance of the driven shaft 11 and the drill, effected by the inertia members 29 moving outwardly from the driving shaft and forcing the conical plate 28 forward, may need to be relieved somewhat as the drill encounters harder portions in the work and, under such circumstances, the pressure on the drill will be relieved by reason of the fact that the inertia members 29 can recede radially inward upon deceleration of the rotating shafts. However, in order to make the feeding of the drill more sensitive and to provide a positive drive of the inertia members, the disc 25 is provided on its forward face with raceways 31 in which the inertia members are seated. As illustrated more particularly in Figs. 8a, 8b and 8c, the raceways are of arcuate formation and are formed on a radius greater than the inertia members 29 which are in the form of balls or spherical members. Fig. 8a illustrates the disc 25 and one of the balls 29 when the parts are at rest; Fig. 8b illustrates the relative position of the ball in the raceway under normal operating conditions, in the sense that the disc is rotating in the direction of the arrow in Fig. 8b and the ball rides up on what might be termed the rear wall of the raceway; and Fig. 8c illustrates the relative position of the ball in its raceway when the cycle of operation has been completed and the parts are returning to their normal positions of rest. Assuming that the balls 29 occupy a position such as represented in Fig. 8b, as is true under normal drilling conditions, if the drill encounters a relative hard section in the work, there is a tendency to retard the rotation of the shafts, under which condition the balls will tend to move from the position illustrated in Fig. 8b to the position illustrated in Fig. 8a and, due to the fact that the raceways are of greater depth at their centers, the balls will, theoretically, be moving away from the conical plate 28 and thus relieving the pressure on that plate, as well as on the driven shaft and drill. Conversely, as the balls move from the lowest point in the bottom of the raceway (Fig. 8a) to a higher point (Fig. 8b), when the machine is placed in operation the pressure on the cone-shaped plate 28 will increase by reason of this circumferential movement of the balls, as well as by the radial movement of the balls with respect to the disc 25. Due to the fact that the pressure exerted by the balls on the conical plate 28 is regulated by both their circumferential and radial movement relatively to disc 25, the component force by which the drill is fed or advanced is more readily affected or more accurately controlled, so that the present tool has a highly sensitive feed. Provision of the raceways for the balls 29 also effects a positive drive of the latter, as distinguished from imparting a rotary motion to them by frictional contact with the disc 25. In this way, the centrifugal action on the balls is positive.

The length of the working stroke of the driven shaft 11 and drill 10 is determined by the stop 24 in the forward end of housing 20. This stop 24 screws into a threaded ring 32 in the housing and by adjusting the stop 24 axially of shaft 11, the length of the working stroke can be varied. The inner end of stop 24 is bored, with the inner portion of the bore of conical formation, as at 33, and carried on the shaft 11 is a sleeve 34, said sleeve and shaft being capable of having relative rotary motion, such relative rotary motion being limited by a pin 35 in shaft 11 engaging in the slot 36 in the sleeve 34. The forward end of this sleeve 34 is tapered as at 37, and the rear end of said sleeve is provided with a slot 38, through which the lug 30 projects, so as to be normally positioned to engage the forward end of sleeve 27 by which the driven shaft is fed forward. Lug 30 is in the form of a pin yieldingly urged outwardly by a spring 39, said pin being formed with a shoulder adapted to engage the inner surface of sleeve 34. Sleeve 34, which may be termed a camming sleeve or camming member, is formed of variable thickness at its rear end or at opposite sides of slot 38, where it is engaged by the shoulder on pin 30, so that, upon relative rotary movement of shaft 11 and sleeve 34, the increased thickness of the sleeve adjacent slot 38 will depress pin or lug 30 to a point where sleeve 27 can ride over it or be advanced independently of said sleeve and driven shaft 11. This relative rotary motion of sleeve 34 with respect to shaft 11 is effected by engagement of the conical forward end of the sleeve in the tapered bore of stop 24. During a normal drilling operation the parts will be associated as depicted in Fig. 1, but when the driven shaft and bit have been advanced to the limit, the forward end of sleeve 34 engages in the bore of stop 24 and, ultimately, sufficient friction between the surface of these two elements is developed to maintain the sleeve 34 stationary with respect to shaft 11, whereupon the pin 30 is depressed and the sleeve 27 advanced over said pin. The initial movement of sleeve 27 over the pin is illustrated in Fig. 2. As stated, there is a time interval between the moment the forward end of sleeve 34 engages in the tapered bore of stop 24 and the moment at which the sleeve 34 is held stationary by frictional contact with stop 24. During this time interval there will be substantially no axial advance of the driven shaft and drill bit and in actual practice it is estimated that the driven shaft will make in the neighborhood of twenty to twenty-five revolutions before sufficient friction is developed between sleeve 34 and stop 24 to bind the sleeve. By thus permitting the driven shaft to make these additional revolutions after the forward advance of the shaft and drill bit has been interrupted, the bottoms of holes drilled in the work will be found to be smooth and free of burrs or irregularities on the surface. It should be added that, after pin 30 has been depressed to clear sleeve 27, the driven shaft is retracted under the influence of coil spring 40 surrounding shaft 11 and interposed between the forward end of sleeve 34 and the bottom of the bore in stop 24.

After the pin or stop 30 has been depressed to clear the sleeve 27, shaft 11 is not only free to be retracted under the influence of spring 40, but, in addition, the cone-shaped plate 28, with its sleeve 27, is also free to be advanced independently of shaft 11 under the influence of the centrifugally actuated weights or balls 29, due to the fact that the resistance normally offered by the driven shaft through stop 30 no longer exists. Sleeve 27 being thus free to advance, this additional forward movement of said sleeve is utilized for cutting off the current to motor 18. This is accomplished by providing a plunger 41, slidable in housing 20 and engageable with the switch 19, the said plunger being so positioned with respect to the flange 27$^b$ on sleeve 27 as to not interrupt the circuit until the drilling operation has been completed. If desired, the base of switch 19 may be slotted and attached to the housing 20 by means of a wing nut 42 for permitting adjustment by means of which the moment of circuit interruption with respect to the completion of the drilling operation may be varied at will. This advance of sleeve 27 independently of the driven shaft 11 may also be utilized for applying a braking force to the sleeve to reduce the time required to bring the sleeve and driving shaft to rest. For instance, a brake shoe in the form of a sectional annulus 43 may be provided in the interior of the housing with the two sections of the annulus normally held spaced apart axially of the housing by springs 44. This brake shoe is in the path of flange 27$^b$ on sleeve 27, so that, when the sleeve is thrust forward independently of the drive shaft, the flange will engage the brake shoe and quickly arrest rotation of the driving shaft. When the tendency of the sleeve 27 and conical plate 28 to move forward under the influence of the rotating driving shaft and the centrifugally actuated balls has been sufficiently reduced by engagement of the flange 27$^b$ with brake shoe 43, the sleeve 27 and conical plate 28 are returned to their initial starting positions or normal positions of rest under the influence of a spring 45 interposed between the forward end of the housing and an annular abutment 46 on said sleeve. The power built up in this spring 45 need only be sufficient to return the sleeve 27 and conical plate 28 to their retracted positions, because, as previously described, the varying taper or inclination of the conical plate 28 compensates for variances in the centrifugal force imposed on the balls 29 by the driving shaft when the tool is being operated.

After sleeve 27 has been retracted and totally withdrawn from over the pin 30, so that the latter is again free to be projected through slot 38 in sleeve 34, the latter is restored to its original position or given a reverse rotary motion to that which was effected by its engagement with stop 24, by a spring 47 coiled around the driven shaft. One end of spring 47 is engaged in a recess in the driven shaft and its other end engaged in a recess in sleeve 34.

Briefly described, the operation of the tool is as follows: With the parts in the positions shown in Fig. 1, driving shaft 14 is rotated by motor 18 and, as its speed of rotation increases, balls 29 move outwardly. This outward movement of the balls forces conical plate 28 and sleeve 27 forwardly and, as the latter is engaged against pin 30, the driven shaft 11 carrying the drill bit 10 is advanced. When the driven shaft and drill bit have reached the limit of their advanced movement, dependent upon the axial position of stop 24 in housing 20, the forward end of sleeve 34 engages stop 24 and, after the driven shaft has made a few additional revolutions, the sleeve 34 binds on the stop 24, so that continued rotation of the driven shaft moves the pin 30 along the slot 38 in sleeve 34, bringing the pin into engagement with the thicker portions of the sleeve. This has a camming action on the pin and depresses it, so that the sleeve 27 can move over the pin, as illustrated in Fig. 2. At this moment, spring 40 has been compressed and, with the pin 30 below the inner surface of sleeve 27, that spring can retract the driven shaft 11. Under these conditions, sleeve 27 is free to be advanced under the influence of the balls 29 and conical plate 28, so that it is moved forward an additional distance to bring the flange 27b on sleeve 27 into engagement with the brake shoe 43. This movement of flange 27b into contact with the brake shoe takes place almost instantaneously. As stated, Fig. 2 shows the sleeve 27 just after its forward end has moved over pin 30 and this figure also illustrates flange 27b in engagement with brake shoe 43. Fig. 3 shows the driven shaft fully retracted under the influence of its spring 40 and also shows the sleeve 27 still advanced, with its retracting spring 45 still compressed. The parts remain in these positions momentarily until the brake has decelerated the revolving, whereby spring 45 will come into play and return sleeve 27 to the position shown in Fig. 1, at which time spring 47 will effect a reverse movement of sleeve 34, and spring 39 will project pin 30 out to its normal position for engagement with the forward end of sleeve 27, thus restoring all of the parts for the next operation of the drill.

Fig. 9 illustrates a modified form of the cone-shaped plate against which the inertia members act to advance the sleeve 27 and the driven shaft. In this instance, the cone-shaped plate indicated at 28a is curved in lieu of being composed of a plurality of inclined surfaces each of different inclination. In this modified form of plate, successive sections taken axially thereof are formed with different curvatures, so as to compensate for the increased centrifugal force imposed on the balls as they move radially outward from the shaft. In other words, in the modification, successive portions of the plate are formed with a greater radius just as in the preferred embodiment successive portions are formed with lesser inclination outwardly from the shaft.

In referring to the plates 28 and 28a as being conical, that term is used in a liberal sense, as neither of said plates is, strictly, conical in shape. They are actually composed of a series of frusto-conical surfaces, each of different taper.

What I claim is:

1. A compensating feeding machanism for rotary cutters comprising a driving shaft, a driven shaft on which the cutter is mounted, a sleeve on the driven belt shaft normally rotatable therewith, an abutment carried in said driven shaft and yieldingly held advanced beyond the periphery of said sleeve, a disc fixed on the driving shaft, a cone-shaped plate having an extension engageable with said abutment, means confined between said disc and plate responsive to rotation of the shafts to advance said plate axially of the driving shaft to force the driven shaft forwardly, means for retarding rotation of said sleeve at a predetermined point in the advance of the driven shaft, and means operable by retardation of said sleeve to depress said abutment to clear said plate extension whereby the driven shaft may be retraced independently of said plate.

2. A compensating feeding mechanism for rotary cutters comprising a driving shaft, a driven shaft on which the cutter is carried, and means for advancing the driven shaft axially of said driving shaft, said means including a cone-shaped plate engageable with the driven shaft, a disc fast on the driving shaft and opposed to said plate, a plurality of raceways of arcuate cross-sectional contour in the surface of said disc opposed to said plate, and a plurality of spherical inertia members confined in said raceways between the disc and plate and movable along said raceways to force said plate away from the disc axially of the shafts, the curvature of the surface of said members being formed on a radius less than that of the cross-sectional contour of the raceways whereby the inertia members can roll transversely of said raceways, the spacing of said disc and plate also being variable dependent upon the position of the inertia members transversely of their raceways.

3. A compensating feeding mechanism for rotary cutters comprising a driving shaft, a driven shaft on which the cutter is carried, and means for advancing the driven shaft axially with a variable pressure, said means including a cone-shaped plate engageable with the driven shaft, a disc fast on the driving shaft, radial raceways in said disc, and inertia members confined between the plate and disc in said raceways, said raceways being disposed toward said plate and of varying depth transversely thereof and said members being of less width than said raceways and free to move laterally of said raceways whereby the pressure exerted by said members against the cone-shaped plate is variable depending up the positions of said members transversely of their respective raceways.

4. A compensating feeding mechanism for rotary cutters comprising a driving shaft, a driven shaft on which the cutter is carried, and means for advancing the driven shaft axially with a variable pressure, said means including a cone-shaped plate engageable with the driven shaft, a disc fast on the driving shaft, and inertia members confined between said disc and the cone-shaped surface of said plate for forcing said plate away from the disc axially of the shafts, said members being individually movable radially and circumferentially of the disc and the pressure exerted by said members on said plate being variable depending upon the positions of said members both radially and circumferentially with respect to said disc.

5. A compensating feeding mechanism for rotary cutters comprising a driving shaft, a driven shaft on which the cutter is carried, and means for advancing the driven shaft axially with a variable pressure, said means including a cone-shaped plate enageageable with the driven shaft, a disc fast on the driving shaft, and inertia members confined between said disc and the cone-shaped surface of said plate for forcing said plate away from the disc axially of the shafts, said members being individually movable radially and circumferentially of the disc and the pressure exerted by said members on said plate being variable depending upon the positions of said members both radially and circumferentially with respect to said disc and the degree of taper of the cone-shaped surface of said plate decreasing outwardly from said shafts.

6. A compensating feeding mechanism for rotary cutters comprising a driving shaft, a driven shaft on which the cutter is carried, said driven shaft being movable axially with respect to the driving shaft, means operable by the driving shaft and engageable with the driven shaft for axially advancing the latter with a yielding pressure, a stop having a conical bore, and releasing means comprising a conical surface engageable with the conical bore of said stop at a predetermined point in the advance of said driven shaft for disengaging the driven shaft and said advancing means, said releasing means being rendered operative by said advancing means forcing the same against said stop with a predetermined pressure after initial contact of said releasing means with said stop, whereby the cutter can continue to operate momentarily at the limit of its advance movement.

7. A compensating feeding mechanism for rotary cutters comprising a driving shaft, a driven shaft on which the cutter is carried, means operable with a variable pressure by the driving shaft for advancing the driven shaft axially, said advancing means including a sleeve surrounding the driving shaft and a depressible plunger in the driven shaft normally engaged by said sleeve, a camming member on the driven shaft for depressing said plunger and releasing the driven shaft from the sleeve, and a stop positioned in the path of said camming member at a predetermined point in the advance of the driven shaft, said camming member being operable by frictional engagement with said stop developed by said pressure advancing means after initial contact of said camming member with said stop whereby the driven shaft can continue to rotate momentarily at the limit of its advance movement.

8. A compensating feeding mechanism for rotary cutters comprising a driving shaft, a driven shaft on which the cutter is mounted, a sleeve on the driven shaft normally rotatable therewith, an abutment carried by said driven shaft and yieldingly held advanced beyond the periphery of said sleeve, means responsive to the rotation of the shafts to advance the driven shaft forwardly, said shaft-advancing means comprising a member engageable against said abutment, means for retarding rotation of the sleeve at a predetermined point in the advance of the driven shaft, and means operable by retardation of said sleeve to disengage said abutment from said shaft-advancing member, whereby said driven shaft can be retraced independently of said shaft-advancing means.

PHILIP S. CLAUS.